UNITED STATES PATENT OFFICE.

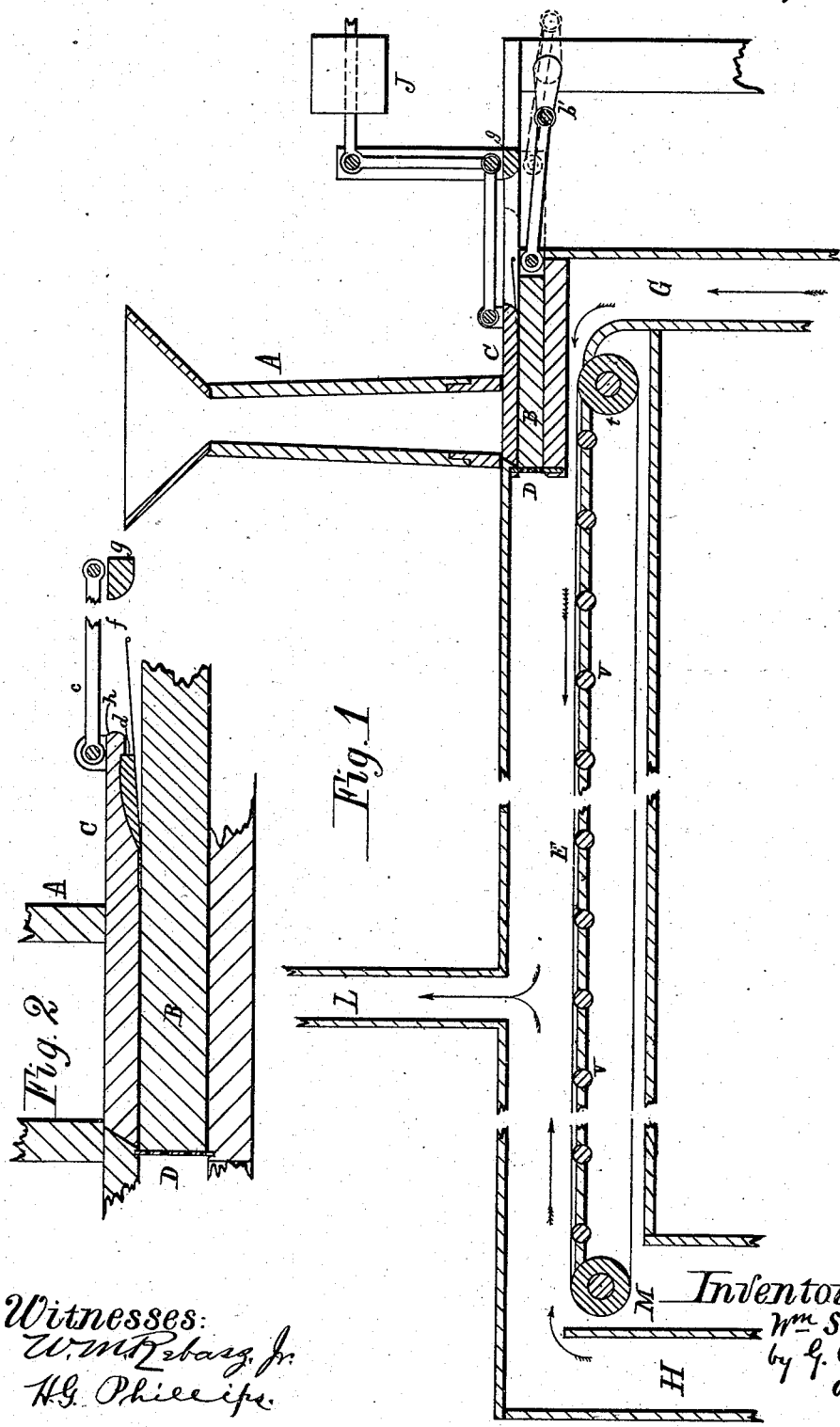

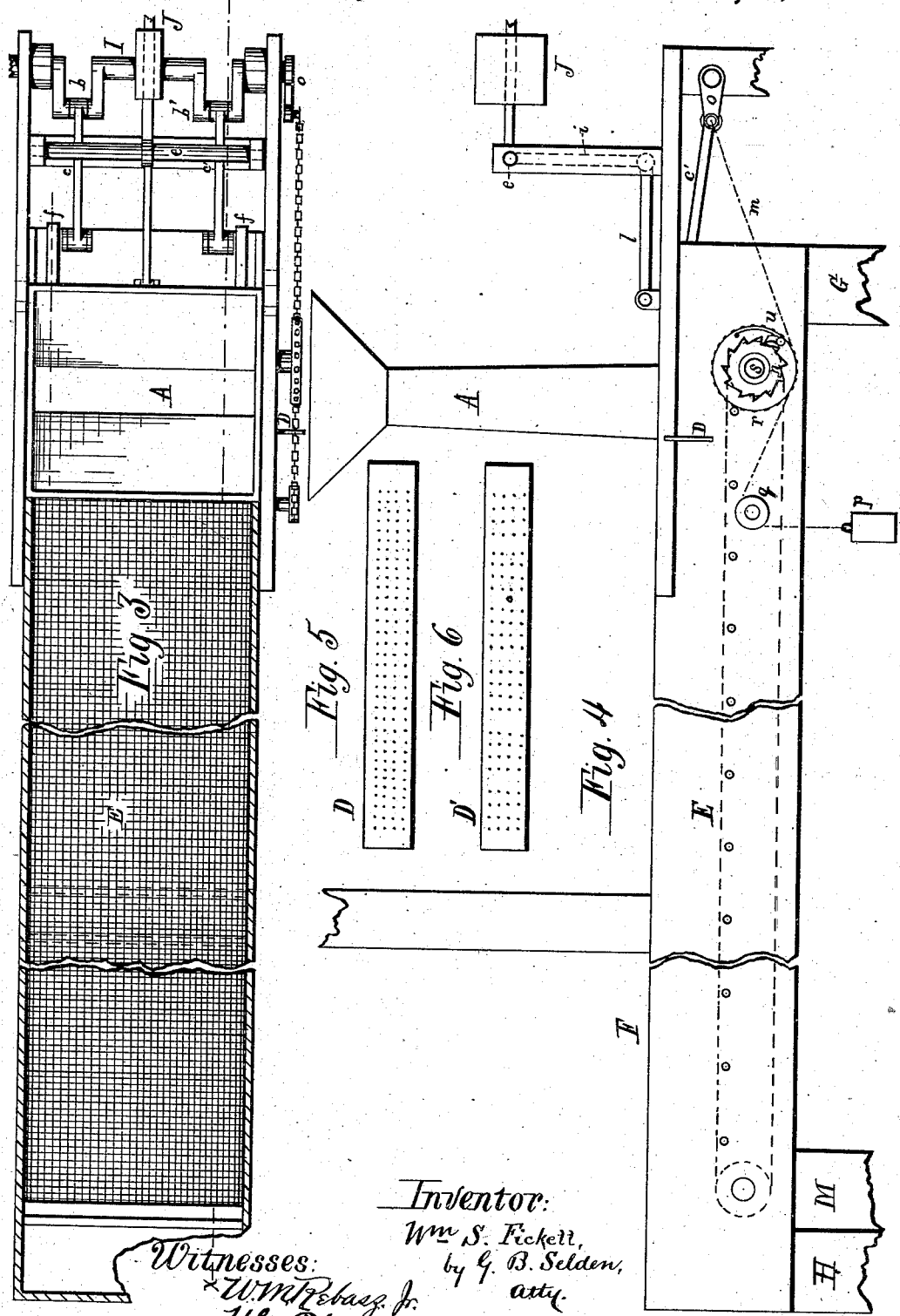

WILLIAM S. FICKETT, OF ROCHESTER, NEW YORK, ASSIGNOR TO WILLIAM W. SHERAR, OF SAME PLACE.

PROCESS OF AND APPARATUS FOR PREPARING FOOD.

SPECIFICATION forming part of Letters Patent No. 240,900, dated May 3, 1881.

Application filed July 29, 1880. (No model.)

*To all whom it may concern:*

Be it known that I, WILLIAM S. FICKETT, of the city of Rochester, county of Monroe, and State of New York, have invented an Improved Process of and Apparatus for Preparing Articles of Food, of which the following is a specification, reference being had to the annexed drawings, in which—

Figure 1 is a central longitudinal section of my improved food-making machine on the line $x\ x$, Fig. 3. Fig. 2 is an enlarged vertical section, showing the construction of the valve at the lower part of the hopper and the plunger. Fig. 3 is a plan view, partly in section, of my improved machine. Fig. 4 is a side view of my improved food-making machine. Figs. 5 and 6 represent the perforated plate.

My invention relates to an improved process and apparatus for manufacturing articles of food from vegetable substances; and it consists in reducing the same to a plastic mass by cooking, in forcing the cooked material through a perforated plate, and in subjecting the fibered material to a current of heated air upon its discharge from the plate, thereby utilizing the heat contained therein.

My invention also consists in an improved apparatus for carrying out the above process, as hereinafter more fully set forth.

My improved apparatus is represented in the accompanying drawings, in which A is the hopper; B, the reciprocating plunger; C, the valve; D, the perforated plate; and E, the endless belt, on which the material to be operated upon is dried by a current of hot air. The belt E is inclosed in a suitable horizontal box or casing, F, through which currents of air are admitted at either end thereof through the hot-air passages G and H.

The object of my invention is the production of a machine capable of rapidly and cheaply converting any suitable cereal or other food, after having been cooked or reduced to a plastic mass, into a fibered and dried product capable of various uses in the culinary arts.

The hopper A, which receives the material to be operated upon, is provided at its bottom with a reciprocating valve, C, and a reciprocating plunger, B, by the combined action of which the material in the hopper is allowed to fall into the chamber occupied by the plunger, by which it is forced through the perforated plate D. The hopper A is preferably made with inclined sides, so that it is larger at the bottom than at the top, for the purpose of facilitating the passage of the material through it. The walls of the chamber, in which the plunger B reciprocates, and the valve C, are made of sufficient thickness to resist the pressure caused by forcing the plastic material through the perforated plate D. The plate D is arranged to slide in grooves at the inner end of the plunger-chamber, and passes through the side of the drying-box F, so that it may be removed. The plate D is perforated with a series of holes varying in size from one-sixteenth to one-eighth of an inch. The plate may be perforated continuously with rows of holes at equal distances apart, as shown at D, Fig. 5, or it may be perforated, as shown at D', Fig. 6, with a series of holes, leaving solid or unperforated spaces between them. The object of the latter arrangement is to deliver the material onto the endless belt E in rows, with intervening uncovered spaces between them, for the purpose of permitting the freer access of the hot air.

Reciprocating motion is given to the plunger B by means of cranks $b\ b'$ on the driving-shaft I, which may be operated either by hand or power. The cranks $b\ b'$ are connected with the plunger B by the connecting-rods $c\ c'$, one of which is located at each side of the plunger, for the purpose of securing the proper motion thereof. As the plunger B is withdrawn or moved toward the right in Fig. 1 by the rotation of the cranks $b\ b'$ the valve C is also withdrawn by means of the spring-catch $d$, which engages with it, so that an opening is made between the hopper A and the plunger-chamber for the passage of the material in the hopper into the plunger-chamber. The return motion of the valve C, so as to close this opening, is obtained by the weight J on an arm of the rock-shaft $e$, which operates to force back the valve before the plunger B returns. The spring-catch $d$ is attached to the upper side of the plunger B by a spring, $f$, which extends outward, and when the plunger and valve have attained the end of their travel comes in contact with an incline or cam, g, by which the end of the spring is depressed, the catch d is released from the hook h on the valve, and the latter is at once forced back by the weight J, operating through the rock-shaft e, arm i, and connection l. The cam g may be carried by a suitable cross-bar attached to the sides of the machine, or the cross-bar itself may form the cam. The valve C is attached to the plunger B by a similar arrangement of spring-catches at each side thereof. The rock-shaft e is supported by suitable standards at each side of the machine.

In order to obtain the requisite intermittent motion to the endless sieve E, I operate it from the crank-shaft I by means of a chain, m, and ratchet-wheel n, Fig. 4. A crank, o, is attached to the outer end of the crank-shaft, and the chain m, which is secured to the crank, receives a reciprocating motion therefrom, the other end of the chain being attached to a weight, p, by which the backward motion of the chain is produced. The chain runs over a corner pulley, q, and about a sprocket-wheel, r, which is loose on the shaft s of the roller t, which carries one end of the endless sieve E. The reciprocating motion of the chain is transmitted to the sprocket-wheel, and this, by means of the spring-pawl u, operates the ratchet-wheel n, fixed on the shaft s, by which an intermittent rotary motion will be given to the roller and endless sieve. The crank o is so located on the crank-shaft I with reference to the cranks b b' that the forward motion of the sieve E is simultaneous with the motion of the plunger B by which the material is forced through the perforated plate D. The material is therefore deposited on the sieve E by the operation of the machine in a continuous layer without breaks or uncovered spaces.

The sieve E may be of any required length to subject the material placed thereon to the action of the current of hot air long enough to insure the thorough drying thereof. The sieve is supported at intervals by the small rollers v v, Fig. 1, passing across the machine and revolving in the sides of the drying-box. Currents of hot air are introduced into the drying-box through the air-trunks G and H, provision being made for the escape of the heat and moisture through the flue L.

It will be observed that the material to be operated on is submitted, on its discharge, in threads or fibers through the perforated plate D, and, while falling through the air onto the sieve E, to the action of the heated air-current G. The object of this arrangement is to utilize as much as possible the heat which the fibered material retains after its passage through the plate.

In order to effect the drying operation as rapidly as possible, I employ a higher degree of heat on the end of the sieve where the material is deposited from the perforated plate than at the other end, where the moisture has been more or less removed therefrom. The temperature of the current of air G at the head of the sieve may be as high as 300°, while a considerably lower temperature should be employed at the other end of the sieve, to prevent scorching or burning of the material. The dried and fibered product is discharged from the machine by the motion of the belt through the spout M, Fig. 1, where it may be received into suitable receptacles.

The length of the belt E will vary with the amount of material required to be passed through the machine in a given time and the speed at which the machine is run. From thirty to sixty feet long will answer a good purpose for the belt E.

The heated air may be applied to the sieve E in several different places on its length by means of additional air-spouts between G and H.

My improved apparatus is designed to manufacture a cooked, dried, and fibered product from pease, beans, squashes, pumpkins, hulled corn or other grains, and other vegetable substances.

In the operation of the machine the material to be reduced to fibers is prepared by cooking it in a suitable kettle or boiler until it is reduced with continual stirring to a doughy mass containing as little water as possible, after which it is immediately introduced into the hopper and worked through the machine. A convenient mode of conducting the cooking operation is by the use of a steam-jacketed boiler, as the temperature can be readily regulated in such a device.

I do not claim herein anything shown or claimed in my Patent No. 233,085, dated October 12, 1880.

I claim—

1. The herein-described process of preparing articles of food from vegetable substances, consisting in reducing the same to a plastic mass by cooking, forcing the cooked material through a perforated plate, and subjecting the fibered material to a current of heated air immediately on its discharge from the plate, whereby the heat contained therein is utilized, substantially as described.

2. The combination of the hopper A, valve C, plunger B, perforated plate D, and supporting-belt E, arranged within the drying-box F, provided with suitable heated-air inlet and outlet passages, substantially as described.

WM. S. FICKETT.

Witnesses:
GEO. B. SELDEN,
H. G. PHILLIPS.